April 15, 1952     E. W. KAISER     2,592,574
PIPE JOINT FITTING
Filed Oct. 29, 1948     2 SHEETS—SHEET 1
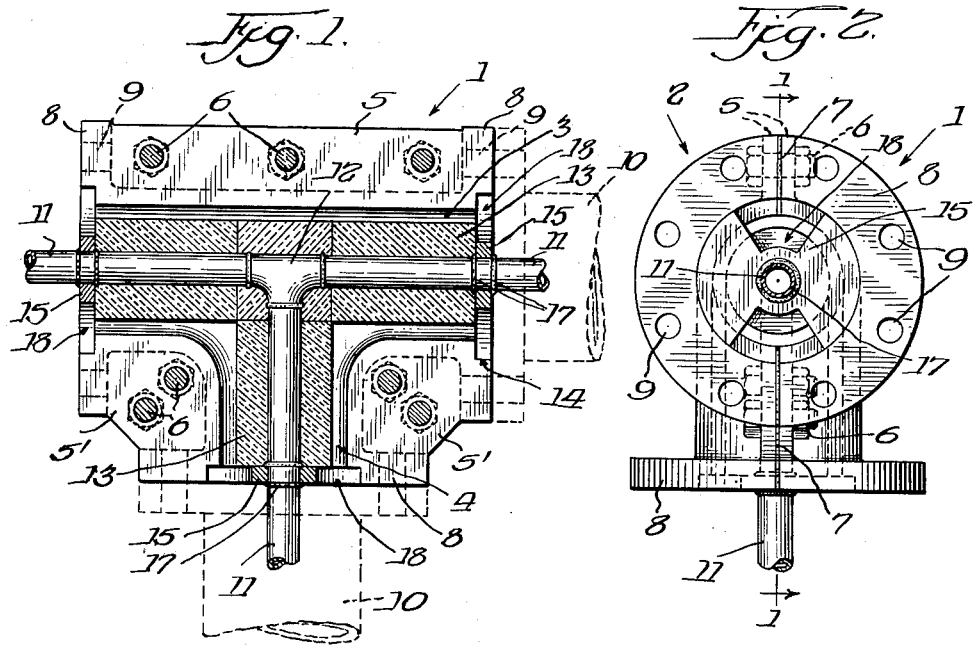
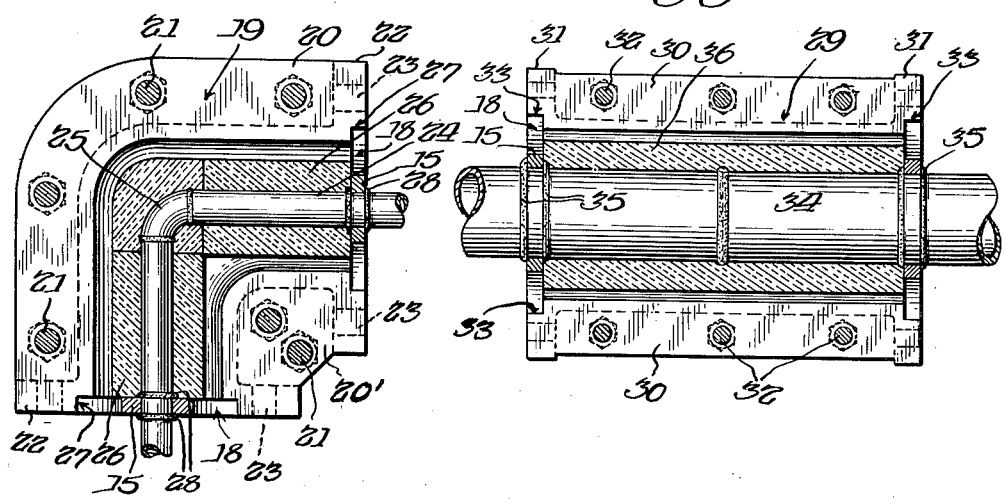
Inventor:
Edward W. Kaiser,
By W. F. Kellogg
Atty.

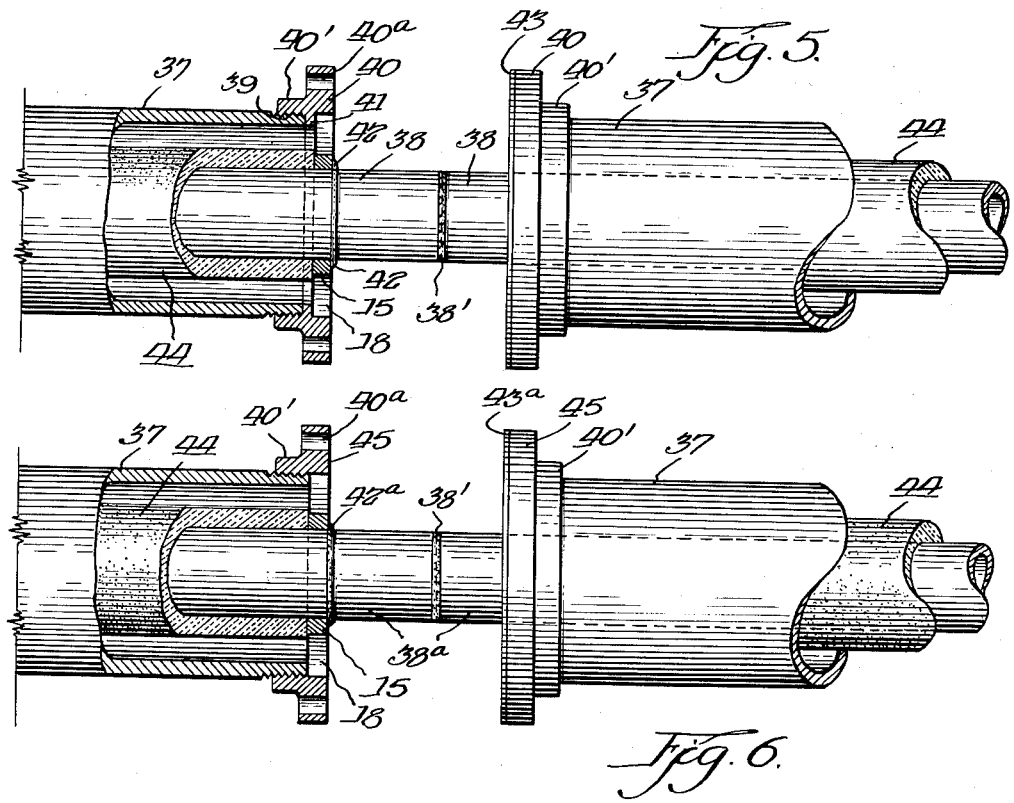
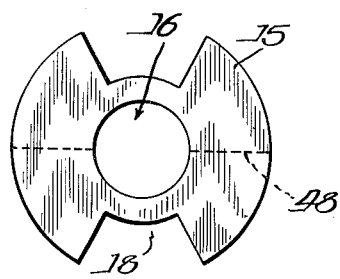
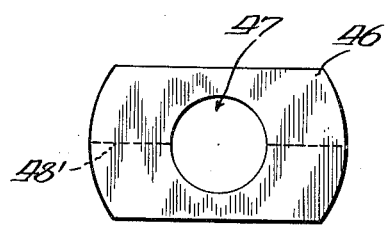
Inventor:
Edward W. Kaiser.
By W. F. Kellogg
Atty.

Patented Apr. 15, 1952

2,592,574

UNITED STATES PATENT OFFICE 2,592,574

PIPE JOINT FITTING

Edward W. Kaiser, Chicago, Ill.

Application October 29, 1948, Serial No. 57,221

12 Claims. (Cl. 138—87)

This invention relates to improvements in pipe joint couplings, fittings, sleeves or similar devices, generally used for communicatively connecting the sections of casings, conduits, jackets, housings, pipes, or kindred tubular bodies of housed or jacketed conduit systems, either in parallel or angular relationship, the invention having for an object to provide such a device with means for receiving and operatively retaining therein or thereon an anchor plate, whereby to control the extent of longitudinal movement of the housed or jacketed inner pipe with relation to a receiving housing or jacket, hence, ensuring fixed location of the inner pipe and preventing creeping thereof at the point of anchorage, but, at the same time, permitting its expansion and/or contraction between the point or points of anchorage.

It is also an object of the invention to provide a device of the stated character, the body construction of which will permit easy and rapid placement of an anchor plate therein and will, with operative installation in a line, positively prevent the anchor plate from having longitudinal or other objectionable movement at the point of anchorage thereof.

Yet another object of the invention is to provide a device as indicated above, which, when and while installed in the line of a conduit system, will permit convenient and quick access to be had to an anchor plate retained therein for inspection, removal, repair, replacement, or any other purpose, all without disturbing the sustaining connection between the housing or jacketing sections of the system line, and so, generally and operatively retaining the line intact.

A further object of the invention is to provide a jointure effecting device and pipe anchor plate constructed and arranged in a manner to produce between the same and an inner pipe received therethrough and connected thereto, an overall longitudinally continuous and unimpeded flow-way.

The invention also aims to provide a jointure effecting device and anchor plate for conduit systems of the housed or jacketed inner pipe types, capable of satisfactory operation or usage either with or without insulation about and over the inner pipe.

A further and important object of the invention is to provide an anchor device for the inner pipes of conduit systems, which will effectually and positively connect an inner pipe to a housing, jacket or fitting receiving and retaining the same, and which is dependent in no manner on connection and/or anchorage with or to any means, whatsoever, extraneous to said housing, jacket or fitting; the anchoring operation of the invention being effected entirely within the system housing, jacket or fitting, and not beyond or outwardly thereof.

The foregoing, as well as other objects, advantages and meritorious teachings of my invention, will be in part obvious and in part pointed out in the following detailed disclosure thereof, when taken in conjunction with the accompanying drawings, it being understood that the forms of the invention presented herein are precise and what are now considered to be the best modes of embodying its principles, but that other modifications and changes may be made in specific embodiments without departing from its essential features.

In the drawings:

Figure 1 is a longitudinal section through a T-joint fitting constructed in accordance with my invention, the section being taken on the line 1—1 of Figure 2, looking in the direction in which the arrows point, so as to show one of the complemental fitting parts and its side connecting flanges in elevation, the inner pipe being fragmentally shown in elevation.

Figure 2 is an end elevation of the T-joint fitting showing an anchor plate seated in its near end.

Figure 3 is a longitudinal section similar to Figure 1, of a 90° elbow type of joint fitting constructed according to my invention.

Figure 4 is a like longitudinal section of a sleeve coupling type of joint including my invention.

Figure 5 is a fragmentary disassembled elevational view, partly in section, showing a modified form of the invention, whereby an anchor plate is retained between the juxtaposed ends of a conduit system or line jackets or housings.

Figure 6 is a view similar to Figure 5, of a slightly modified form of the invention shown therein.

Figure 7 is a detail face view of the type of anchor plate shown installed in the joint fittings of the preceding figures, and Figure 8 is a like view of a modified form of anchor plate.

Prior to proceeding to the following detailed description of my invention, it should be noted that heretofore, pipes, and especially the inner pipes of conduit systems, have been anchored against undesirable movement within their housings or jackets by engaging the same with anchor plates at points inwardly of such housings or jackets and then extending portions of the plates outwardly from and beyond the outer peripheries or surfaces of said housings or jackets, whereupon the extended portions are imbedded or otherwise fixedly secured to stationary masses of concrete or the like placed in the adjacent earth, or in some instances, free of the earth. Thereby, it is hoped that the inner pipes will be prevented from having longitudinal movement at their points of anchorage, within the housings or jackets receiving them. In many instances, however, such types of anchorage are unsatisfactory. They are neither permanent nor positive in operation. They entail needless labor and material expense in and by their installation. In certain types of conduit system installations, they are materially, if not totally, inefficient.

It is, therefore, an objective of my invention to provide a means for anchoring inner pipes to housings or jackets at predetermined distances throughout their lengths, which means are of simple, durable, long lifed and over-all efficient construction, capable of being installed with a minimum expenditure of labor and time and being conveniently and readily accessible without disruption of a system in which they are installed, whereby to permit inspection, necessary repair, replacement, etc.; furthermore, an anchoring means which is dependent in no manner whatsoever upon any connection with the earth in which the system may be laid, or upon connection with any stationary mass or means imbedded in or laid on the earth in proximity to the housings or jackets of the conduit system.

It is of equal importance to note that my improved anchoring means may be also efficiently and satisfactorily employed in connection with those conduit systems which are constructed or installed above the surface of the earth, i. e., systems which can be identified as aerial or submarine systems. In these particular types of installations, it is most desirable, if not imperative, that anchoring of the inner pipes to their housings or jackets at predetermined distances shall be effected completely and wholly within said housings or jackets in sharp contradistinction to being connected in any manner to fixed or stationary means or devices arranged beyond and outwardly of such housings or jackets.

Referring in detail to the drawings, and particularly, to the form of invention shown in Figures 1 and 2 thereof, which illustrate a T-joint fitting, the same comprises a pair of complementally shaped and sized T-shaped body sections 1 and 2, preferably cast from iron, but capable of being made of any other suitable kind of material. These body sections each are of cross-sectionally semi-circular shape, so that when assembled in operative juxtaposed relation, as shown in Figure 2, they constitute a cross-sectionally circularly shaped T-joint fitting body having therethrough a longitudinal way 3 and an intermediate and right angularly disposed communicating branch-way 4. Complemental flanges 5 and 5' are formed or otherwise provided on the opposite longitudinal side edges of the body sections and are adapted to receive transversely therethrough suitable connecting bolts 6. If desired, gaskets 7 can be arranged between the bolt connected flanges 5 and 5'. Complemental flanges 8 are also formed or provided on the outer ends of said body sections and have connecting bolt receiving openings 9 therein, in order that the T-joint fitting assembly can be connected to the adjacent flanged ends of housings or jackets 10 in which the same is interposed, as clearly indicated in dotted lines in Figure 2. It will be noted that the flanges 5' also serve to reinforce their respective body sections between the branch outer end flanges 8 thereof.

It should be here noted that the diameters of the body section ways 3 and 4 correspond to the inside diameters of the housings or jackets 10 (see dotted line showing in Figure 1) connected thereto, as above described. Thus, a continuous and unimpeded flow-way through the joint fitting or fittings and the interconnected housings or jackets is effected for those purposes and/or reasons shown, described and claimed in my co-pending applications for Letters Patent, Serial No. 511,366, filed November 22, 1943, now Patent No. 2,570,246, and Serial No. 47,851, filed September 4, 1948.

An inner pipe or pipe line 11 is provided within and extends longitudinally and substantially centrally spaced throughout the T-joint fitting comprised by the body sections 1 and 2 and the housings or jackets 10 connected to its branches. Said inner pipe may consist of a plurality of endwise arranged sections of appropriate lengths and diameters suitably interconnected between their adjacent ends and within the T-joint fitting 1—2 by suitable T-joint fittings, such as indicated at 12. The outside diameters of the sections of the inner pipe 11 and the fitting or fittings 12, are less than the inside diameters of the T-joint fitting 1—2 and the housings or jackets 10, and so, provides the aforesaid continuous flow-way therebetween.

In some types of installations of conduit systems including my improved joint fittings, such as shown in Figures 1 and 2, as well as those shown in other forms thereof, illustrated by Figures 3, 4, 5 and 6 of the accompanying drawings and hereinafter more fully described, it is desirable that the inner pipe 11 and its joint fitting or fittings 12 shall be encased in sleeves of form sustaining insulating material (see Figures 1 and 2), generally identified at 13. The outside diameters of these insulating sleeves are less than the inside diameters of the T-joint fitting or fittings 1—2 and the housings or jackets 10. Consequently, the above referred to flow-way is effected continuously therebetween.

The lengths of the form sustaining heat insulating sleeves 13 within the T-joint fitting 1—2, as shown in Figure 1, extend nearly to but in inwardly spaced relation to the outer ends of the ways 3 and 4, for a purpose which will be presently described.

In order that anchoring connection between the inner pipe 11 and the joint fitting 1—2 can be effected, whereby to prevent longitudinal movement or creeping of said inner pipe at its point of anchoring in and to said fitting, yet at the same time permit expansion or contraction of the pipe between such points of anchorage, I form or otherwise provide in and about the, or certain of the outer and free ends of the T-joint fitting body sections, specifically identified by the numerals 1 and 2, like internal shoulders or seats 14 of suitable width and depth. When the body sections are arranged and secured in assembled relation, as above described, the juxtaposed shoulders or seats 14 are contiguous, one with the other, and constitute circularly shaped internal seats.

Anchor plates 15 (see Figure 7), made of steel or other suitable material, are adapted to be received in all or certain of the circularly shaped seats 14—14 in the outer and free ends of the branches of the T-shaped joint fitting 1—2. The anchor plates each comprise a circularly shaped body whose diameter is such that it will, individually, snugly though removably engage in and on the seats 14—14, and whose gauge or thickness is such that it will, when received in said seats, have its outer side substantially flush with the corresponding sides of the particularly adjacent end flanges 8, as shown in Figure 1. A centrally located opening 16 is formed in each anchor plate 15. Its shape and size permits snug slidable engagement over the pipe 11 and movement of the plate to seating engagement in any one of the circular seats 14—14 in the ends of the joint fitting assembly 1—2. With seating of the anchor plate, the same may, in some instances, be fixedly secured to an adjacent portion of the pipe 11 by welding, at 17. However, where relatively angularly directed stresses or thrusts are applied to the T-branch portions of the inner pipe 11, it is obvious that actual connection between the anchor plates 15, arranged as shown in Figure 1, and adjacent portions of said inner pipe, is not necessary to effect the anchoring of said pipe to the T-joint fitting.

Ports or ways 18 are formed, preferably, in diametrically opposite portions of each of the anchor plates 15, extending and opening onto the peripheral portions thereof. Said ports, because of their location in said anchor plates, effect communication between the flow-ways of the housings or jackets 10 and joint fitting 1—2, and the inner pipe 11, and hence, avoid impedance to and sustained or continuous passage of matter therethrough.

A T-joint fitting 1—2, such as above described, can be installed between the housings or jackets of a conduit system line in different manners. And by the same token, it will be understood and appreciated by workers skilled in this art that a number of such joints may and preferably will be installed in a conduit system line at distances apart. It is preferable, however, that one of the body sections of the T-joint fitting—1 or 2—be placed under, and receive the inner pipe 11 (with or without the insulating sleeves 13) in and through its ways in the manner shown in Figure 1. Thereupon, the flanged ends of the laid body section are bolted or otherwise connected to portions of the abutting flanged ends of adjacent housings or jackets 10. Anchor plates 15 are then engaged in certain or all of the internal shoulders or seats 14 in the free ends of the connected body section transversely of the same and, if desired, welded or otherwise fixed to adjacent portions of the inner pipe 11, as at 17. The remaining and complemental body section of the T-joint fitting is then matchingly engaged over the connected body section so that the side flanges 5 and 5' of the two are juxtaposed with a gasket 7 therebetween, if desired. Connecting bolts 6 are then engaged through aligning openings in said side flanges whereby to connect the fitting body sections 1 and 2 in their assembled and operative relation, following which, the end flanges of the last mentioned body section are connected to adjacent portions of the flanged ends of the housings or jackets 10.

Welding or other connection between the fitting installed anchor plates 15 and the inner pipe 11 can, of course, be effected following an assembly and connection of the body sections 1 and 2 of the T-joined fitting or fittings over and about said inner pipe, but prior to movement of the flanged ends of the housings or jackets 10 into abutting engagement and connection therewith.

It will be understood and appreciated that a joint fitting such as I have hereinbefore described, will function, in combination with anchor plates 15 installed therein, to positively prevent relative longitudinal movement of an inner pipe 11 with respect thereto, but at the same time, will permit of expansion and/or contraction of lengths of such inner pipe between the point or points of anchoring in the fitting or fittings. Additionally, at such time when it may become necessary to have access to the interior of an installed T-joint fitting 1—2, such access may be conveniently and quickly had merely by removing the connecting bolts 6 from the juxtaposed side flanges 5 and 5', then removing the bolts connecting the end flanges 8 of one of its body sections to the flanged adjacent ends of housings or jackets in which the fitting is installed. At such time, the end flange disconnected body section 1 or 2 may be removed from the other thereof, and so, expose and give complete access to the fitting interior. In consequence, inspection, repair, replacement, etc., of pipe sections, fittings, insulating sleeves, as well as anchor plates 15 arranged or installed in the fitting, can be most advantageously effected. And by the same token, disruption of the line of the conduit system, as would be incurred were the entire joint fitting removed, rather than a part thereof, is avoided, i. e., since one of the body sections of the joint fitting—1 or 2—remains connected to the adjacent ends of the conduit system housings or jackets 10, the line will be maintained bodily intact.

Joint fittings of different designs or types from that hereinbefore described, but, nevertheless, embracing my invention, may be produced. To this end, and as partially illustrative, I invite attention to the forms of joint fittings shown in Figures 3, 4, 5 and 6 of the accompanying drawings.

In Figure 3, a 90° elbow joint fitting embodying the invention, is shown. Herein, the fitting consists of a pair of complementally shaped and sized elbow body sections 19, preferably cast from iron, though capable of being made of any other suitable material, one of which is shown in the figure. Said body sections each are cross-sectionally semi-circular in shape, and hence, when arranged in matched juxtaposed relation in that manner shown in Figure 2, constitute a cross-sectionally circularly shaped elbow joint fitting having substantially right angularly arranged open ends. Complemental flanges 20 and 20' are formed or otherwise provided on the opposite side edges of the body sections and are adapted to receive transversely therethrough suitable connecting bolts 21. A packing (not shown) can, if desired, be arranged between the bolt connected flanges 20 and 20'. Complemental flanges 22 are formed or otherwise provided on the outer ends of said body sections 19 and have bolt receiving openings 23 therein to receive bolts (not shown) therethrough, for connecting the elbow joint fitting assembly to the adjacent flanged ends of housings or jackets of a conduit system in which said assembly or a number thereof is or are installed. Attention is directed to the arrangement and formation of the flanges 20' which, additionally, function to reinforce their respective body sections (one of which is shown in Figure 3) between the right angularly arranged branches thereof.

As in the form of invention shown in Figure 1 of the drawings, the inside diameters of the matched and assembled body sections 19, correspond to the inside diameters of those housings or jackets which are or may be connected thereto.

Thus, as between the inside diameters of the joint fitting body sections and the housings or jackets connected thereto, a continuous and unimpeded flow-way is effected.

An inner pipe or pipe line 24, of right angular or elbow formation, is received within and extends longitudinally and substantially centrally spaced throughout the elbow joint fitting consisting of the aforesaid body sections 19. Said inner pipe, as shown, comprises a pair of relatively right angularly arranged lengths or sections connected at and between their adjacent ends by means of a conventional type of elbow fitting 25. The outside diameters of the lengths of the inner pipe 24 and the fitting or fittings 25, are less than the inside diameters of the elbow joint fitting assembly 19, and therefore, maintain the aforesaid continuous flow-way therebetween.

The illustrated 90° elbow joint fitting is shown as having the inner pipe or pipe line housed therein provided with encasing sleeves made of form sustaining insulating material, indicated at 26, whose outside diameters are less than the inside diameters of the elbow joint fitting assembly and the housings or jackets to which the same is connected. Thus, the longitudinal continuous flow-way between the inner pipe or pipe line 24, and particularly, between the outer peripheries of the insulating sleeves 26 and the inside diameter of the joint fitting assembly, is maintained.

Internal anchor plate receiving and retaining seats 27 are formed or otherwise provided in and about the outer and free ends of the body sections 19, and as will be noted, open onto the body section end flanges 22. Thus, when the body sections 19 are arranged and secured in the heretofore described assembled relation, the juxtaposed internal anchor receiving seats are contiguous, one with the other, and so, constitute a wholly circular anchor plate receiving means. The depths and diameters of the thus constituted seats are such that they will snugly though removably receive anchor plates 15 therein, whose outer faces or sides will lie flush with respect to the adjacent sides of the body section end flanges 22.

With arrangement of anchor plates 15 in the right angularly opposed sides of the assembled elbow joint fittings 19, the ports 18 in said plates will, obviously, effect and maintain communication between the longitudinal flow-ways of the fittings and the housings or jackets to which the same is connected.

The anchor plates 15 provided to the open and opposite ends of the elbow joint fitting 19 may, if desired, be connected to adjacent portions of the inner pipe or pipe line 24 by welding, as at 28 though as heretofore described in connection with the embodiment of the invention shown in Figure 1, such connection can be dispensed with, since stresses or thrusts imparted to the angularly disposed branches or legs of said pipe or pipe line 24, will be at relatively right angles to either one of said anchor plates 15.

The invention may also be embodied in a sleeve type of joint fitting, as shown in Figure 4, wherein the fitting is made of a straight tubular body of cross-sectionally circular shape medially and longitudinally divided throughout its length into a pair of complemental body sections, one of which is shown and identified by the reference numeral 29. The fitting body can be of cast iron or other suitable material, such as conditions or preference may dictate.

Straight longitudinal flanges 30 are formed on or otherwise provided to the opposite sides of the body sections, while connecting flanges 31 are formed on the semi-circularly curved opposite ends thereof and are adapted to be abuttingly contacted with the flanged ends of housings or jackets (not shown) between which the joint fitting is to be connected. The longitudinal flanges 30 in one body section 29 are flushly contacted throughout their lengths with those of the opposite and juxtaposed body section 29, whereupon connecting bolts 32 are engaged through the same. The thus effected assembly provides the aforesaid cross-sectionally circularly shaped sleeve joint fitting whose opposite ends will be circularly flanged, as above described, for connection to the adjacent and abutting flanged ends of said housings or jackets. Gaskets or the like (not shown) may, of course, be interposed between the end flanges of the fitting and the housings or jackets, for an obvious purpose.

Internal shoulders or seats 33 are formed in the opposite outer ends of each of the body sections 29 for snugly and removably receiving anchor plates 15 therein. The depths of the internal seats 33 are such that the anchor plates received therein will have their outer faces arranged flush or substantially flush with the adjacent faces of the connecting flanges 31 so as to ensure flush engagement of the housing or jacket flanged ends, above referred to, with and over the body sections connecting flanges 31, as well as effect the firm securing of the anchor plates 15 in and on their respective internal seats 33.

Connection between the above described anchor plates 15 and the inner pipe 34 passing longitudinally through the sleeve joint fitting, in substantially centrally spaced relation thereto, and through said anchor plates 15, is effected by welding or otherwise connecting the anchor plates to adjacent portions of the inner pipe, as at 35.

The inner pipe 34 engaged through the sleeve joint fitting may or may not have a form sustaining insulating sleeve 36 engaged over and about the same, but in either event, it is to be noted that a continuous and longitudinally disposed over-all flow-way is effected and maintained between the inner periphery of the fitting and the outer periphery of the inner pipe 34 and/or the insulating sleeve 36; furthermore, that the ports 18 formed in the anchor plates 15 mounted in the fitting will avoid any material or detrimental impedence of said flow-way.

Instead of employing a sleeve type of joint fitting, as shown in Figure 4, for the straight-away or line jointure of housings or jackets of a conduit system, I can, most advantageously, substitute and use the form of joint illustrated by Figure 5 of the drawings. This joint, by its simplified construction, reduces material costs. The endwise arranged housings or jackets 37 which longitudinally receive therethrough, in substantially spaced relation, sections of inner pipes 38, have their juxtaposed ends externally screw-threaded, as at 39. End connecting flanges 40, of substantially complemental form having internally screw-threaded collars or throats 40' on their opposite and outer sides, are turned onto the adjacent screw-threaded ends 39 of the housings or jackets 37, and thus, are fixedly mounted. An internal and inwardly disposed annular lip 41 is formed or otherwise mounted on one of the flange bodies 40 in spaced relation to the inner face thereof, and forms an annular seat therein. Said seat is sufficiently deep to hold and snugly receive a circular anchor plate 15, whereby its outer face or side will be substantially flush with the corresponding face of the receiving flange. The anchor plate is, of course, engaged over and about the adjacent inner pipe section 38 and connected thereto by welding, at 42. Therefore, when the meeting ends of the pipe sections 38 are joined, as by welding 38', and the housings or jackets 37 and their respective connecting flanges 40 are longitudinally moved into abutting engagement and interconnected by bolts or other devices (not shown) passed through aligning openings 40a in said flanges, a secure connection or jointure is effected therebetween. Additionally, the anchor plate will be effectually housed and secured and will function to positively anchor the connected pipe sections 38—38 to the housings or jackets 37, in order that their longitudinal movement at this point of anchorage will be prevented.

Of course, gaskets or similar packings 43 can be arranged between the meeting and abutting faces of the connecting flanges 40, prior to their bolting together, if desired.

The ports 18, in the anchor plate 15, obviously, render the longitudinal flow-ways between the outer sides of the inner pipes 38 and the inner sides of the housings or jackets 37 communicatively continuous; furthermore, said pipes 38, if desired, may have sleeves 44 of form sustaining insulation arranged thereabout with the adjacent or juxtaposed ends of the same in abutting engagement with the adjacent and opposite sides of the installed anchor plate 15.

Whereas, I have hereinbefore set out that but one of the connecting flanges 40 is provided with the internal inwardly disposed annular lip 41, it is to be understood that both connecting flanges may be so provided, particularly, where in effecting a joint of the character indicated, it is desirable that the anchor plate 15 shall be partially received in and by the internal annular seats of each of the flanges 40. Such an arrangement may be particularly desirable where the gauge or thickness of materials from which the plate 40 is formed must be greater to successfully withstand unusually heavy thrust loads.

Another form of end connecting flange jointure for the housings or jackets of a conduit system is shown in Figure 6 of the drawings. In this embodiment of the invention, housing or jacket end connecting flanges 45 are threadedly engaged with the adjacent ends thereof. However, the internal annular lips 41 of the Figure 5 illustrated construction are eliminated and said ends of the housings or jackets have but limited engagement in and through their respective connecting flanges, i. e., the inner ends of the same are in spaced relation to the inner and juxtaposed faces or sides of said flanges, and so, form internal annular seats within the flanges. A ported anchor plate 15 is engaged over the inner pipe sections 38a and welded thereto, at 42a, and is housingly received in said internal annular seats when the housings or jackets and their connecting flanges 45 are moved into abutting engagement and interconnected, as above described.

As in the embodiment of the invention shown in Figure 5, but one of the end connecting flanges 45 may be formed with an internal annular seat, this being accomplished merely by turning its particular housing or jacket into and through the end connecting flange therefor until the end of said housing or jacket is brought into substantially flush arrangement with relation to the inner side of the flange.

A gasket 43a may, of course, be interposed between the adjacent faces or sides of the end connecting flanges 45, for an obvious purpose.

While I heretofore described, with some degree of particularity, my improved joint fittings and/or joints as being provided with a form or type of anchor shown in Figure 7 of the accompanying drawings, it is to be fully understood that different forms or types of anchors may be substituted. For example, the anchor plate 15 of Figure 7 may be replaced by an anchor constructed in accordance with Figure 8 of the drawings. This modified form of anchor, indicated by the numeral 46, comprises a flat or sheet-like plate of suitable material of appropriate gauge or thickness and of substantially rectangular configuration; the opposite ends of the anchor plate being curved outwardly or arcuately shaped so that they will conform or substantially conform to the degree of curvature of a housing or jacket in which the same may be installed. The anchor plate 46 is provided with an intermediately disposed circular opening 47 whereby it may be engaged over and about the inner pipes of a conduit system and the depth of said plate is such as to be less than the inside diameter of housings or jackets in which the same is or may be arranged. Thus, with operative positioning of the anchor plate 46, ports or ways will be provided as between the outer peripheral surface of the inner pipe or pipes and the inner peripheral surface of housings or jackets of an equipped conduit system, whereby to maintain the aforesaid continuous and unimpeded flow-way in and through the conduit system, as hereinbefore described.

The anchor plates 15 and 46 can, if and when desired, be made of two rather than one-piece construction. To effect the former, either or both said anchor plates can be cut medially through, as indicated in dotted lines by the reference characters 48 and 48'. Thus, the divided parts of the anchor plates can be individually engaged under and over the adjacent and to-be-anchored portions of inner pipes in edgewise aligned or matching relation, whereupon the meeting edges of said parts can be interconnected by welding or other means.

I have found, as hereinbefore indicated, that my improved joint fittings, and conduit system housing or jacket jointures, such as shown in Figures 5 and 6 of the drawings, can be satisfactorily cast from iron. Certain of the benefits resulting from such fabrication are that the products (the joint fittings and jointures) are entirely capable of withstanding, with an ample margin of safety, great compression and tensile loads which, it may be expected, will be transmitted thereto following their system installations; that in being able to resist such loads or stresses, they will be prevented from performance failures, i. e., crushing, fracture, etc., with attendant coincidental difficulties, and that they will successfully resist those great load thrusts and torque which will be delivered thereto during their presence and use in the housings or casing lines of a conduit system. By the same token, however, it will be understood and appreciated that other and known materials may be utilized in and for the construction of devices embracing my invention, amongst which there are brass, steel and certain metal alloys. In general, therefore, it is essential that the devices of my invention shall be made of materials possessing abilities or properties which will enable them to effectually and safely resist high and even abnormally high compression, tensile, thrust and torque stresses.

I claim:

1. In combination, a tubular body having open ends, made of material possessing high compression and tensile stress resistant properties, said body being medially and longitudinally divided into sections, means for interconnecting said sections, flanges on the body about and adjacent its open ends having flat faces, said body having internal seats formed therein inwardly of the flat faces of said flanges and opening onto the same, and anchor plates disposed transversely of said body and engaged in said seats substantially flush with the flat faces of the flanges.

2. In combination, a tubular body made of material possessing high compression and tensile stress resistant properties and having open ends, substantially right angularly disposed flanges mounted on the body adjacent and about its open ends, said body being medially and longitudinally divided into sections, substantially outwardly and right angularly disposed flanges mounted on the opposite sides of the body sections and extending throughout the lengths thereof, the second mentioned flanges being joined at their opposite ends with said first mentioned flanges, means interconnecting said second mentioned flanges in contacting relationship, said body having annular internal seats formed therein inwardly of the first mentioned flanges and opening onto the outer faces of the same, and anchor plates disposed transversely of said body and engaged in said seats substantially flush with the outer faces thereof.

3. In combination, a tubular body having open ends, a pipe in and extending through said tubular body in spaced relation to its inner peripheral surface, jointure effecting means on the body at and about the open ends thereof, said body having internal seats formed therein inwardly of said jointure effecting means and opening outwardly thereonto, and anchor plates engaged in and with said internal seats, said anchor plates receiving said inner pipe therethrough and being connected thereto.

4. In combination, a tubular body having open ends, a pipe received in and through said body in spaced relation to the inner peripheral surface thereof, jointure effecting means on the body at and about the open ends thereof, said body having internal seats formed on and about the same inwardly of said jointure effecting means and opening thereonto, and anchor plates engaged in said internal seats and receiving said pipe therethrough and being connected to said pipe, each of said anchor plates having ports formed in the same communicating with the space between the inner peripheral surfaces of said tubular body and said pipe.

5. In combination, endwise opposed tubular casings of substantially complemental cross-section each having open ends, a pipe received in and longitudinally through said casings in spaced relation thereto, said casings being longitudinally movable with relation to said pipe either toward or away from each other, annular flanges on adjacent open ends of said casings, each of said flanges having annular seats therein opening onto their respective outer sides, said casings and flanges being arranged, at times, in interconnected juxtaposed relation, and a ported anchor plate received in the annular seats of said flanges receiving the pipe therethrough and connected thereto.

6. A joint fitting for interconnecting the spaced apart ends of pipe sections comprising a tubular body having open ends and made of material possessing high compression and tension stress resisting properties, said body being medially and longitudinally divided into sections, means for interconnecting said sections, annular flanges formed integrally with said body adjacent said ends thereof having substantially flat faces for juxtaposition to like faces on like flanges on the respective ends of the pipe sections, and said body having internally arranged annular seats at said ends inwardly of said flat faces and opening outwardly toward the respective pipe sections.

7. A joint fitting for interconnecting the spaced apart ends of pipe sections comprising a tubular body having open ends and made of material possessing high compression and tension stress resisting properties, said body being medially and longitudinally divided into sections, substantially right angularly disposed flanges fixedly mounted upon the opposite sides of said sections and extending throughout the lengths thereof, said flanges being adapted to abuttingly interengage throughout their lengths and widths, means interconnecting said flanges, annular flanges fixedly mounted on said body adjacent said ends thereof for juxtaposition to like flanges on the respective ends of the pipe sections, and said body having annular internal seats formed therein inwardly of said annular flanges and opening outwardly onto the faces thereof and toward the respective pipe sections.

8. A jacketed conduit system for transporting fluids, such as steam, at high temperature comprising, in combination, an outer pipe formed by one piece cylindrical pipe sections made of material possessing high compression and tension stress resisting properties disposed in end to end relation with the juxtaposed ends of one pair of said sections spaced apart, an inner fluid conducting pipe extending through and spaced from said outer pipe sections, an anchor plate secured to said inner pipe and extending transversely of said outer pipe sections between said spaced ends thereof only to their outer periphery and bearing thereon to anchor said inner pipe thereto against relative endwise movement, said anchor plate being ported to provide a continuous flowway around said inner pipe between opposite sides of said anchor plate, and jointure effecting means on said juxtaposed ends of said one pair of pipe sections encircling said anchor plate and having mutual fluid tight engagement.

9. The invention, as set forth in claim 8, wherein the outer pipe sections are formed of cast iron and the anchor plate is formed of steel and is welded to the inner pipe.

10. A jacketed conduit system for transporting fluids, such as steam, at high temperature comprising, in combination, an outer pipe formed by one piece cylindrical pipe sections made of material possessing high compression and tension stress resisting properties disposed in end to end relation with the juxtaposed ends of one pair of said sections spaced apart, an inner fluid conducting pipe extending through and spaced from said outer pipe sections, an anchor plate secured to said inner pipe and extending transversely of said outer pipe sections between said spaced ends thereof only to their outer periphery and bearing thereon to anchor said inner pipe thereto against relative endwise movement, said anchor plate being ported to provide a continuous flowway around said inner pipe between opposite sides of said anchor plate, flanges extending radially outwardly from said juxtaposed ends of said one pair of pipe sections and having juxtaposed faces, at least one of said flanges encircling said anchor plate, and means for clamping said faces of said flanges together in fluid tight relation with said anchor plate between said juxtaposed ends of said one pair of pipe sections.

11. The invention, as set forth in claim 10, wherein the outer pipe sections and the flanges are formed of cast iron and the anchor plate is formed of steel and is welded to the inner pipe.

12. In combination, a tubular body having open ends, a pipe in and extending through said tubular body in spaced relation to its peripheral surface, at least one of the ends of said tubular body being provided with jointure effecting means about the opening thereof, said tubular body having an internal seat formed therein inwardly of said jointure effecting means and opening outwardly thereunto, said seat extending both radially and axially of said tubular body, and an anchor plate engaged in and with said internal seat, said anchor plate receiving said inner pipe therethrough and being connected thereto.

EDWARD W. KAISER.

REFERENCES CITED

The following references are of record in the file of this patent:

UNITED STATES PATENTS

| Number | Name | Date |
|---|---|---|
| 381,916 | Dresser | May 1, 1888 |
| 718,157 | Riber | Jan. 13, 1903 |
| 819,986 | Ellis | May 8, 1906 |
| 1,038,244 | Wagner | Sept. 10, 1912 |
| 1,481,255 | Cumfer | Jan. 22, 1924 |
| 2,031,849 | O'Leary | Feb. 25, 1936 |
| 2,207,518 | Moser | July 9, 1940 |
| 2,340,732 | Bruno | Feb. 1, 1944 |